Oct. 7, 1924.
H. P. HOLLNAGEL
ELECTRICAL MEASUREMENT
Filed May 8, 1918
1,510,780
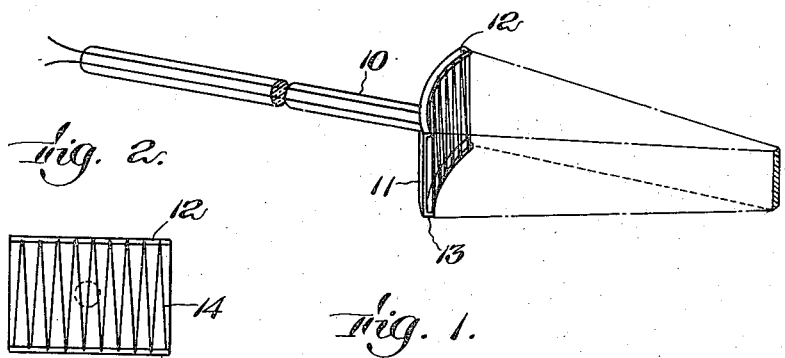
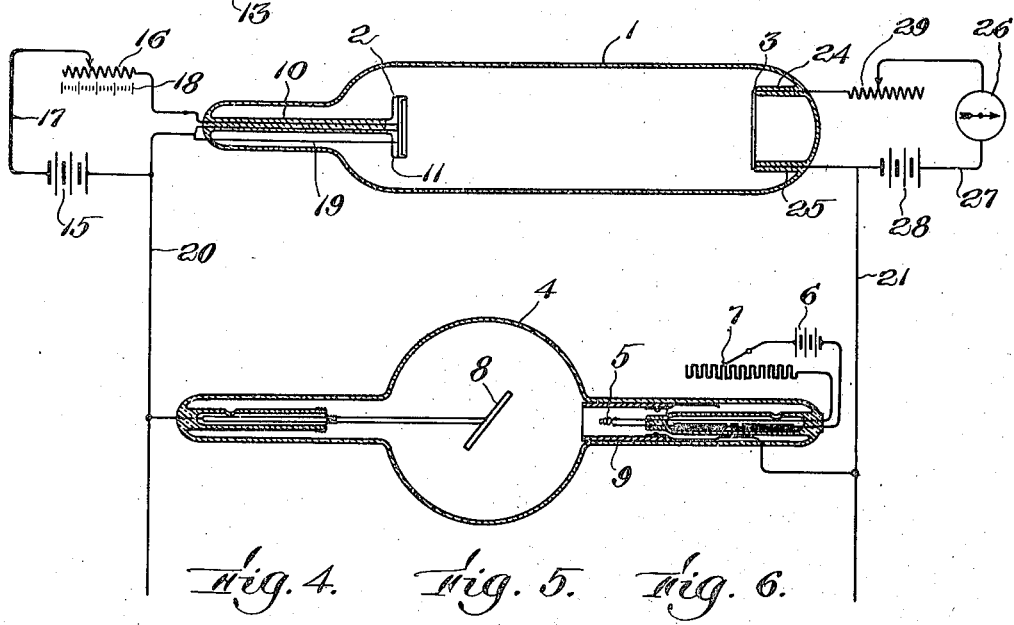
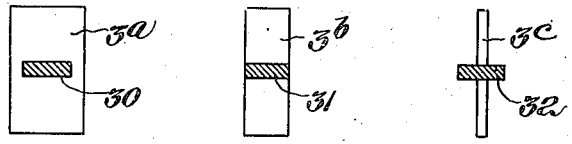
  
Inventor:
Herbert P. Hollnagel,
by Roberts Roberts Cushman
his Attorneys Patented Oct. 7, 1924.

1,510,780

UNITED STATES PATENT OFFICE.

HERBERT P. HOLLNAGEL, OF BROOKLINE, MASSACHUSETTS.

ELECTRICAL MEASUREMENT.

Application filed May 8, 1918. Serial No. 233,252.

*To all whom it may concern:*

Be it known that I, HERBERT P. HOLLNAGEL, a citizen of the United States, and resident of Brookline, in the county of Norfolk and State of Massachusetts, have invented new and useful Improvements in Electrical Measurement, of which the following is a specification.

This invention relates to the measurement of electrical energy, whether kinetic or potential, as for example amperage, voltage, X-ray intensity, etc., and more particularly to the measurement of X-rays of high intensity such as produced by X-ray tubes of the Coolidge type.

Heretofore in measuring the intensity or penetrating power of X-rays it has been customary to measure the rays directly as by determining the thickness of aluminum or other material which the rays will penetrate. With tubes of the early type it is necessary to measure the rays directly inasmuch as the tubes display erratic characteristics and vary widely in their performance. But with tubes of the later type above referred to the intensity of the rays may be determined indirectly owing to the fact that the tubes are constant in performance and produce rays of a definite intensity with a given potential impressed thereupon. However, while tubes of the later type are constant and regular in performance it is of course true that they differ from one another in operation when constructed or operated differently, the rays depending for example upon the distance between the electrodes, the composition of the electrodes, the temperature of the electrodes, etc.

The principal object of the present invention is to determine the character of X-rays accurately and expediently particularly in tubes of the Coolidge type, so that rays of any particular quality may be produced with precision. Another object is to provide X-ray measuring apparatus which may be adjusted to X-ray tubes of different structural and operative characteristics so that differently calibrated scales need not be employed with tubes of different characteristics. Another object is to provide apparatus for use with tubes having practically an absolute vacuum, such as Coolidge X-ray tubes, which possesses characteristics corresponding to such tubes. Another object is to measure electrical energy of high potential, whether alternating or direct. Another object is to provide an improved vacuum tube having a novel cathode and having a novel anode or electronic responsive means.

In one aspect the present invention comprises a method of measuring electrical energy which comprises producing an electronic discharge proportional to the electrical energy and measuring the intensity of the electronic discharge. The electronic discharge is preferably produced in a vacuum so attenuated as practically to eliminate the production of positive ions so that the discharge is practically a pure electronic discharge. The preferred manner of measuring the electronic discharge comprises directing the discharge upon an electronic resistance or upon other means quantitatively responsive to an electronic discharge and measuring the change of resistance or other effect produced by the discharge.

Owing to the fact that X-ray tubes differ in construction and operation different tubes produce rays of different intensity under similar conditions of operating potentials. My improved apparatus may be calibrated as a whole for a particular tube or for tubes which are practically identical; but I prefer to provide means for adjusting the apparatus to any one of a number of dissimilar tubes so that an indicating device calibrated to indicate X-ray intensity can be employed with dissimilar tubes, thereby avoiding the necessity of employing differently calibrated indicating devices for dissimilar tubes. The adjustment may be made by varying the effective distance between the cathode and anode, by varying the vacuum when measuring X-ray tubes having an appreciable amount of gas, by varying the effective size of the cathode or anode, by varying the temperature of the cathode, or by employing any two or more of these methods of adjustment in conjunction. However, my preferred method of adjustment comprises varying the temperature of the cathode and under ordinary conditions of operation this method is alone sufficient.

In another aspect the invention comprises novel apparatus for producing an electronic discharge proportional to a supply of electrical energy and for indicating the intensity of the electronic discharge. My improved apparatus comprises means for emitting an electronic stream and means quantitatively responsive to the electronic stream. I also provide means for directing the electronic stream to the responsive means which may constitute a part of the cathode or may be independent of the cathode. The electronic responsive means preferably comprises a resistance device the resistance of which will vary in proportion to the intensity of the electronic stream impinging thereupon.

In the accompanying drawings,—

Figure 1 is a diagrammatic view illustrating the preferred embodiment of my improved apparatus in operative relationship with a Coolidge X-ray tube;

Figure 2 is a front elevation of an improved cathode employed in my apparatus;

Figure 3 is a perspective view of the improved cathode showing the manner in which it focuses the electronic discharge; and Figures 4 to 9 inclusive are front elevations of various anodes or electronic responsive means which may be employed in my improved apparatus, the cross-hatched portions representing cross-sections of the electronic discharge in the plane of the electronic responsive means.

The particular embodiment of my invention illustrated in Fig. 1 comprises an elongate vacuum tube 1 containing therein a cathode or electron emitting means 2 and an anode or electronic responsive means 3. The X-ray tube 4 with which the tube 1 is associated is of the well-known Coolidge type and comprises a filament cathode 5 arranged to be heated to incandescence by means of a battery 6, the temperature being controlled by a rheostat 7, an anode 8, and a metallic cylinder 9 surrounding the cathode in such manner as to focus the electronic discharge upon the anode. The vacuum in the Coolidge tube is so attenuated as practically to eliminate the production of positive ions during the discharge of electrons from the cathode to the anode. The vacuum in the tube 1 of my improved apparatus is likewise preferably raised to such a point that evidences of positive ionization are substantially absent during operation, especially when the apparatus is to be employed with tubes of the type having practically an absolute vacuum.

The improved cathode (Figs. 1, 2 and 3) comprises a supporting stem 10 and a curved head 11 carrying a filament 14 of tungsten or other suitable material. The head 11 may be of metal, in which case the filament 14 is suitably insulated from the head and the head may be charged to focus the electron discharge as hereinafter described, but I preferably form both the stem 10 and head 11 of glass or other suitable insulating material so that the filament need not be insulated from the head. The curvature of the head 11 will depend upon the character of electronic discharge which it is desired to produce, but in the preferred embodiment of my invention the curvature is substantially cylindrical, the axis of the curved head being disposed in the region of the anode. The head 11 is provided on its curved sides with flanges 12 and 13 projecting forwardly from the head a short distance. The filament 14 is mounted in zigzag fashion on the flanges 12 and 13 so as to lie in a curved plane substantially parallel with the face of the head 11. The various portions of the filament may be connected either in series or parallel, but ordinarily they are preferably connected in series. The various portions of the filament may be disposed in parallelism with each other or they may be disposed somewhat obliquely to each other as shown in Fig. 2. When the head 11 is formed of insulating material I provide means on the head for receiving an electrical charge and this means preferably comprises a coating of silver deposited on the forward face of the head 11 as represented by the stippling in Fig. 2.

On the outside of the tube 1 I provide a battery 15 and a rheostat 16, which are connected in series with the filament 14 by the circuit 17. It will be understood that by varying the resistance 16 in this circuit the temperature of the filament 14 may be regulated. In order to indicate the temperature of the filament I preferably provide a scale such as illustrated diagrammatically at 18 in association with the resistance 16. For the purpose of charging the silver coating on the face of the head 11 I provide a conductor 19 extending from the coating to a suitable source of potential. A suitable source of potential for most purposes comprises the operating circuit to which the tube is connected, and I have therefore shown the conductor 19 connected to one side of the operating circuit 20—21 outside the tube although it will be understood that the connection may be made inside the tube. When the coating is connected directly to the operating circuit there will be substantially no difference of potential between the coating and the filament, the coating being charged to the same degree as the filament.

The electronic responsive means 3 preferably comprises a very thin strip of tungsten, platinum, paladium or other suitable resistance which will withstand an electronic bombardment and the resistance of which will vary in proportion to the intensity of the electronic bombardment. The thin strip of material is disposed in a plane transversely of the tube along the focal axis of the cathode 2. The anode 3 may be mounted in any suitable manner, and for this purpose I have illustrated two hollow glass supports 24 and 25 extending from the end of the tube 1 to the opposite ends of the anode.

Any suitable means for measuring the resistance of the anode may be employed, but for this purpose I preferably provide a galvanometer 26 connected to the opposite ends of the anode through a circuit 27, including a source of current 28 and a rheostat 29.

As above stated, the size and shape of the electronic responsive resistance may be varied to suit various conditions. Thus in Figs. 4 to 6 I have shown anodes $3^a$, $3^b$, $3^c$ and $3^d$ comprising thin rectangular strips of material of different widths. The cathode may be so shaped and adjusted as to focus on the anode a stream of electrons whose cross-section is of lesser width and lesser length than the anode as shown at 30 in Fig. 4, or which is of less length and equal width as shown at 31 in Fig. 5, or which is of less length and greater width as shown at 32 in Fig. 6, or which is of the same length and the same width as shown at 33 in Fig. 7, or which bears any other desired relation to the shape of the electronic responsive means as to produce the desired variation in the resistance of the means. In Figs. 8 and 9 I have illustrated circular anodes $3^x$ and $3^y$ which may be so related to the cross-sectional area of the electronic stream as to be subjected to the electronic stream throughout their entire area as illustrated in Fig. 8 or merely throughout a portion of their entire area as illustrated in Fig. 9. For the purpose of producing an electronic stream of circular cross-section I may employ a cathode and focusing means similar to those employed in the Coolidge type.

For the purpose of measuring high potentials my improved apparatus is connected across the high potential circuit which is represented in the drawing by conductors 20 and 21. The potential to which the tube is subjected will produce an electronic discharge from the heated cathode to the anode which is proportional to the potential of the circuit. By properly constructing and adjusting the tube the electronic discharge may be caused to vary in direct proportion to the potential applied to the tube, but even though the relationship be not a direct relationship the means for measuring the electronic discharge may be calibrated to read accurately in potential differences.

If it is desired to measure the current flowing through a portion of a high potential circuit as for example through the X-ray tube 4 connected across the circuit 20—21, the indicating instrument 26 may be calibrated in current units, in which case the apparatus will measure the current flowing through the X-ray tube inasmuch as the current flowing is proportional to the potential drop across the tube according to the equation $I = \frac{E}{R}$, where R is the effective resistance of the X-ray tube and E is the effective voltage.

The principal use for which my improved apparatus is intended, however, is for measuring the intensity of X-rays, and especially the X-rays produced by X-ray tubes of the type employing practically an absolute vacuum. For this purpose the tube 1 is preferably connected in parallel with the X-ray tube but in reverse manner, that is, with the cathode connected to the side of the circuit to which the anode of the X-ray tube is connected and with the anode connected to the side of the circuit to which the cathode of the X-ray tube is connected. Thus, when used to measure alternating current potential the current flowing through the tube 1 will be produced by the half cycles of potential opposite to the half cycles producing the current in the X-ray tube. In this connection it may be noted that the resistance of the tube 1 may be made equal to or less than the resistance of the X-ray tube, but I prefer to make the resistance much greater so that the amount of current passing through the tube 1 is insignificant as compared with the current flowing through the X-ray tube.

Owing to the fact that the intensity of the X-rays produced by a Coolidge tube is directly proportional to the potential applied to the tube throughout a wide range, the indicating instrument 26 when properly calibrated will indicate the intensity of the X-rays produced by tube 4. The instrument 26 may be calibrated in terms of any of the well known means of measuring the hardness that is to say with known penetrating powers of a Coolidge X-ray tube, as for example, measured in terms of the power of penetration through different thicknesses of water, aluminum or other metal. When employing my improved measuring apparatus with tubes of different characteristics the apparatus may be adjusted as above mentioned to correspond to the character of X-ray tube with which it is to be used, so that the indicating instrument 26 will accurately indicate the X-ray intensity. The preferred means for adjusting the apparatus comprises the resistance 16, although the resistance 29 may, if desired, also be employed for the purpose. When employing the resistance 16 the resistance will be adjusted to a value corresponding to the characteristics of the tube to be measured. In other words, the resistance 16 would be calibrated in terms of hardness or power of penetration for a definite impressed voltage for tubes of different characteristics so that when measuring any particular tube it would be known in advance to what point the resistance 16 should be set in order to have the indicating device 26 accurately indicate the intensity of the X-rays produced by the particular tube. In the process of standardization of such calibrations a standard type of tube for comparison would be developed.

It is also to be understood that in many circumstances both the focusing means and the diaphragm means may be entirely omitted, the electrons being caused to flow predominantly in the direction of the anode by virtue of the positive potential produced on the anode by the operating circuit.

I claim:

1. The method of measuring electrical potential which comprises producing an electronic discharge proportional to the electrical potential, causing the electronic discharge to effect resistance variations, and measuring such effect.

2. The method of measuring electrical energy which comprises producing an electronic discharge proportional to the electrical energy, focusing the electronic discharge upon an electronic receiver, and measuring the effective resistance of the electronic receiver under the influence of electronic discharge.

3. The method of measuring electrical potential which comprises producing an electronic discharge proportional to the electrical potential in a vacuum so attenuated as practically to eliminate the production of positive ions, and measuring the intensity of the electronic discharge.

4. The method of measuring electrical energy which comprises producing an electronic discharge proportional to the electrical energy in a vacuum so attenuated as practically to eliminate the production of positive ions, directing the discharge to effect resistance variations, and measuring such effect.

5. The method of determining the intensity of the rays produced by an X-ray tube comprising producing an electronic discharge proportional to the X-ray intensity, adjusting the electronic discharge to correspond to the X-ray tube characteristics, and measuring the intensity of the electronic discharge.

6. The method of determining the intensity of the rays produced by an X-ray tube comprising producing an electronic discharge proportional to the X-ray intensity, adjusting the quantity of the electronic discharge to correspond to the X-ray tube characteristics, and measuring the intensity of the electronic discharge.

7. The method of determining the intensity of the rays produced by an X-ray tube comprising producing an electronic discharge from a heated cathode proportional to the X-ray intensity, adjusting the temperature of the cathode to correspond to the X-ray tube characteristics, and measuring the intensity of the electronic discharge.

8. Apparatus for measuring electrical energy comprising electronic responsive means, means for directing an electronic discharge upon the responsive means proportional to the electrical energy, and means for measuring the effect produced upon the responsive means by the electronic discharge.

9. Apparatus for measuring electrical energy comprising an alectronic receiver, means for focusing an electronic discharge upon the said receiver, and means for measuring the resistance of said receiver when subjected to the influence of the electronic discharge.

10. In apparatus of the character described the combination of a vacuum tube, electronic responsive means in the tube, a cathode in the tube adapted to discharge an electronic stream to said means, and means for measuring the effect of the electronic stream upon said means.

11. In apparatus of the character described the combination of a vacuum tube, the vacuum in the tube being so high that evidences of positive ionization are substantially absent during operation, electronic responsive means in the tube, a cathode in the tube adapted to discharge an electronic stream to said means, and means for measuring the effect of the electronic stream upon said means.

12. In apparatus of the character described, the combination of a gas-tight envelope, an electronic receiver in the envelope, a cathode in the envelope adapted to discharge an electronic stream to said receiver, and means for measuring the resistance of said receiver.

13. In apparatus of the character described, the combination of a gas-tight envelope, an electronic receiver in the envelope, a cathode in the envelope adapted to discharge an electronic stream to said receiver, and means for measuring the resistance of said receiver, there being insufficient residual gas in said envelope to produce appreciable ionization by collision during operation of the apparatus.

14. In apparatus of the character described, the combination of electronic responsive means, and a cathode arranged to direct a stream of electrons upon said means, the cathode being so arranged that the cross-sectional contour of said stream in the region of said means is in the form of a narrow band.

15. Apparatus of the character described having therein an anode, an electron emitting cathode disposed in a curved plane, and a curved member adapted to be charged whose axis is coincident with said anode disposed behind the cathode.

16. Apparatus of the character described having therein an anode, a series of heated filaments disposed in a cylindrical plane, and a cylindrical surface adapted to be charged whose axis is coincident with said anode disposed adjacent to the filaments.

17. In apparatus for measuring electrical energy, the combination of a thin resistance element, means for discharging an electrical stream on said element proportionate to the energy to be measured, and means for measuring the resistance of said element under the influence of the electronic stream.

Signed by me at Boston, Massachusetts, this 17th day of April, 1918.

HERBERT P. HOLLNAGEL.